United States Patent
Uehira et al.

(10) Patent No.: US 7,645,496 B2
(45) Date of Patent: *Jan. 12, 2010

(54) 1,3,5-TRIAZINE COMPOUND, COMPOSITION, AND OPTICALLY ANISOTROPIC MATERIAL COMPOSED OF THE SAME

(75) Inventors: Shigeki Uehira, Minami-ashigara (JP); Hiroshi Takeuchi, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 52 days.

This patent is subject to a terminal disclaimer.

(21) Appl. No.: 11/812,252

(22) Filed: Jun. 15, 2007

(65) Prior Publication Data

US 2007/0298192 A1 Dec. 27, 2007

(30) Foreign Application Priority Data

Jun. 15, 2006 (JP) .............................. 2006-166563

(51) Int. Cl.
*C09K 19/34* (2006.01)
*C09K 19/54* (2006.01)
*G02B 5/30* (2006.01)
*C07D 251/54* (2006.01)
*C07D 251/70* (2006.01)

(52) U.S. Cl. ................ 428/1.1; 252/299.5; 252/299.61; 544/194; 544/196; 544/200

(58) Field of Classification Search .................. 428/1.1, 428/1.3; 544/194, 196, 200; 252/299.01, 252/299.5, 299.62, 299.61
See application file for complete search history.

(56) References Cited

U.S. PATENT DOCUMENTS

| 6,380,996 | B1 * | 4/2002 | Yokoyama et al. | 349/117 |
| 7,575,696 | B2 * | 8/2009 | Yoshida et al. | 252/299.01 |
| 2008/0023670 | A1 * | 1/2008 | Yoshida et al. | 252/299.01 |

FOREIGN PATENT DOCUMENTS

| JP | 2002-128742 A | 5/2002 |
| JP | 2002-265475 A | 9/2002 |
| WO | WO 2007055417 A1 * | 5/2007 |

* cited by examiner

*Primary Examiner*—Shean C Wu
(74) *Attorney, Agent, or Firm*—Buchanan Ingersoll & Rooney PC

(57) ABSTRACT

A compound of formula (A):

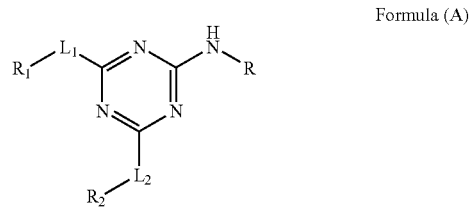

Formula (A)

wherein $L_1$ and $L_2$ each independently are a single bond or a divalent linking group, $R_1$ and $R_2$ each independently are a hydrogen atom or a substituent, and R is a group having a polymerizable group; and a composition, containing at least one of the compound; an optically anisotropic material, containing the compound or the composition; and a liquid crystal display device, containing the optically anisotropic material.

38 Claims, No Drawings

1,3,5-TRIAZINE COMPOUND, COMPOSITION, AND OPTICALLY ANISOTROPIC MATERIAL COMPOSED OF THE SAME

FIELD OF THE INVENTION

The present invention relates to a novel 1,3,5-triazine compound useful as a liquid crystal material, a composition containing the compound, and an optically anisotropic material composed of the compound or composition.

BACKGROUND OF THE INVENTION

A liquid crystal display device generally has a liquid crystal cell and a polarizing plate. A polarizing plate is comprised of a protective film and a polarizing film, and is obtained by a process including: dyeing a polarizing film composed of a polyvinyl alcohol film with iodine, orienting or stretching the resultant film, and laminating a protective film on each of both sides of the thus-oriented film. In a transmissive-type liquid crystal display device, such a polarizing plate is attached to each of the both sides of a liquid crystal cell, and optionally one or more optical compensation film(s) is further provided. In a reflective-type liquid crystal display device, a reflective plate, a liquid crystal cell, one or more optical compensation film(s), and a polarizing plate are arranged in this order. A liquid crystal cell is comprised of a liquid crystalline molecule, two substrates for enclosing the molecule, and electrode layers for applying voltage to the liquid crystalline molecule. Such a liquid crystal cell carries out displaying the state of ON/OFF, depending on difference in the alignment or orientation state of the liquid crystalline molecule. There are proposed display modes, applicable to each of the transmissive-type and reflective-type displays, such as TN (twisted nematic), IPS (in-plane switching), OCB (optically compensatory bend), VA (vertically aligned), and ECB (electrically controlled birefringence) modes.

An optically anisotropic layer is used for various liquid crystal display devices, in order to eliminate image coloration or widen viewing angle. As the optically anisotropic layer, oriented birefringent polymer films have been used. It has been proposed to use an optically anisotropic layer formed of a liquid crystalline molecule on a transparent support, in place of the optically anisotropic layer of the oriented birefringent film. Since liquid crystalline molecules provide various alignment forms, the use of liquid crystalline molecules has made it possible to realize optical properties that are not achievable using conventional oriented birefringent polymer films.

The optical properties of the optically anisotropic layer are determined depending on the optical properties of liquid crystal cells, specifically depending on difference in display mode as mentioned above. The use of liquid crystalline molecules allows the production of optically anisotropic layers having various optical properties depending on various display modes of liquid crystal cells. Rod-like liquid crystalline molecules or discotic liquid crystalline molecules are generally used as liquid crystalline molecules. Optically anisotropic layers using liquid crystalline molecules have already proposed for various display modes.

There is a report of a method of producing an optically anisotropic material in which a low-molecular bifunctional liquid-crystal acrylate compound is used (JP-A-03-014029 ("JP-A" means unexamined published Japanese patent application)). This technique includes aligning a low-molecular bifunctional liquid-crystal acrylate compound or composition in twisted nematic alignment, and then photopolymerizing the compound or composition such that the alignment state would be fixed.

On the other hand, in recent years, it has become essential to form a liquid crystal cell into a thin film in order to reduce the weight and manufacturing costs of liquid crystal display devices. Consequently, it has become necessary to achieve a desired optical anisotropy by the use of a thinner film as an optically anisotropic layer. In order to solve this problem, it is necessary to increase the refractive index anisotropy (Δn) of liquid crystal compounds to form optically anisotropic layers.

Known examples of polymerizable liquid crystal compounds with large Δn include compounds having a tolane moiety in the molecule, as disclosed in JP-A-2002-128742 and JP-A-2002-265475. However, a tolane-series compound has an absorption in a longer wavelength side, and thus it is feared that it may be difficult to proceed radical polymerization of the compound and that the compound may cause coloration of optically anisotropic layers. Further, since a tolane compound is low in stability to light, it is not necessarily preferred in view of film stability.

SUMMARY OF THE INVENTION

The present invention resides in a compound represented by formula (A):

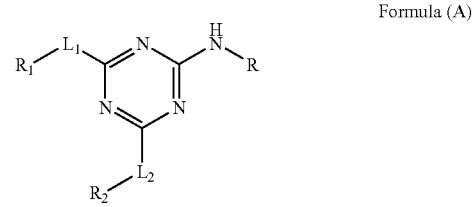

Formula (A)

wherein $L_1$ and $L_2$ each independently represent a single bond or a divalent linking group, $R_1$ and $R_2$ each independently represent a hydrogen atom or a substituent, and R represents a group having a polymerizable group.

Further, the present invention resides in a compound represented by formula (I):

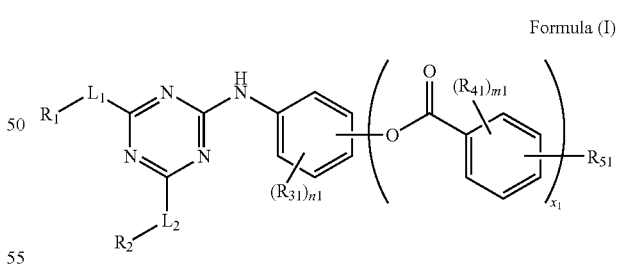

Formula (I)

wherein $L_1$ and $L_2$ each represent a single bond or a divalent linking group, which may be the same or different from each other; $R_1$ and $R_2$ each independently represent a hydrogen atom or a substituent; $R_{31}$, and $R_{41}$, each represent a substituent, which may be the same or different from each other; n1 represents an integer of 0 (zero) to 4; when n1 is 2 or more, $R_{31}$'s may be the same or different from each other, or $R_{31}$'s may form a ring, if possible; m1 represents an integer of 0 (zero) to 4; when m1 is 2 or more, $R_{41}$'s may be the same or different from each other, or $R_{41}$'s may form a ring, if possible; $X_1$ represents an integer of 0 (zero) to 5; when $X_1$ is 2 or more, $(R_{41})_{m1}$'s may be the same or different from each other; and $R_{51}$ represents an alkoxy group, an alkoxycarbonyl group, or an alkoxycarbonyloxy group, each of which has a group represented by P1, P2, P3, or P4, in which an alkoxy moiety of the group represented by $R_{51}$ may have an ether bond therein:

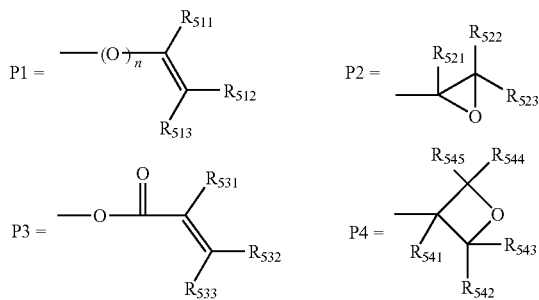

wherein $R_{511}$, $R_{512}$, $R_{513}$, $R_{521}$, $R_{522}$, $R_{523}$, $R_{531}$, $R_{532}$, $R_{533}$, $R_{541}$, $R_{542}$, $R_{543}$, $R_{544}$, and $R_{545}$ each independently represent a hydrogen atom or an alkyl group; and n represents 0 (zero) or 1.

Further, the present invention resides in a compound represented by formula (II):

Formula (II)

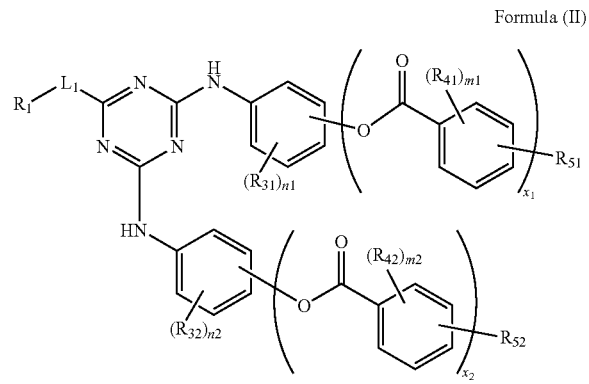

wherein $L_1$ represents a single bond or a divalent linking group; $R_1$ represents a hydrogen atom or a substituent; $R_{31}$, $R_{32}$, $R_{41}$, and $R_{42}$ each represent a substituent, which may be the same or different from each other; n1 and n2 each independently represent an integer of 0 (zero) to 4; when n1 is 2 or more, $R_{31}$'s may be the same or different from each other, or $R_{31}$'s may form a ring, if possible; when n2 is 2 or more, $R_{32}$'s may be the same or different from each other, or $R_{32}$'s may form a ring, if possible; m1 and m2 each independently represent an integer of 0 (zero) to 4; when m1 is 2 or more, $R_{41}$'s may be the same or different from each other, or $R_{41}$'s may form a ring, if possible; when m2 is 2 or more, $R_{42}$'s may be the same or different from each other, or $R_{42}$'s may form a ring, if possible; $X_1$ and $X_2$ each independently represent an integer of 0 (zero) to 5; when $X_1$ is 2 or more, $(R_{41})_{m1}$'s may be the same or different from each other; when $X_2$ is 2 or more, $(R_{42})_{m2}$'s may be the same or different from each other; and $R_{51}$ and $R_{52}$ each independently represent an alkoxy group, an alkoxycarbonyl group, or an alkoxycarbonyloxy group, each of which has a group represented by the aforementioned P1, P2, P3, or P4, in which an alkoxy moiety of the group represented by $R_{51}$ or $R_{52}$ may have an ether bond therein.

Further, the present invention resides in a compound represented by formula (III):

Formula (III)

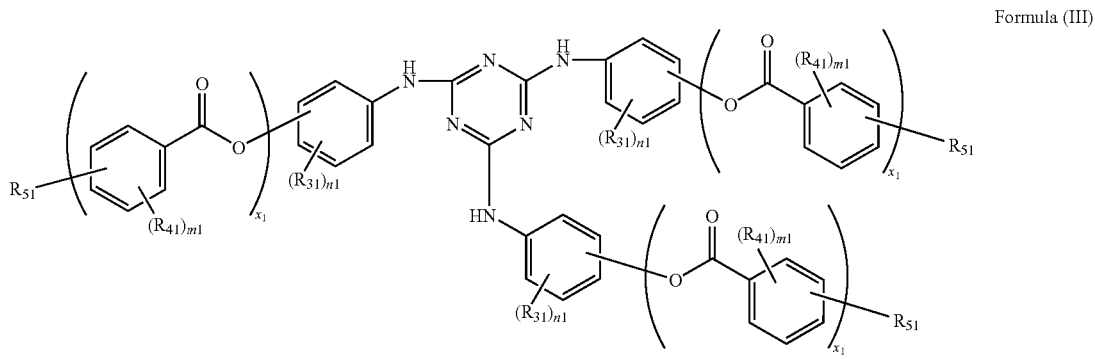

wherein $R_{31}$ and $R_{41}$ each represent a substituent, which may be the same or different from each other; n1 represents an integer of 0 (zero) to 4; when n1 is 2 or more, $R_{31}$'s on a single benzene ring may be the same or different from each other, or may form a ring, if possible; m1 represents an integer of 0 (zero) to 4; when m1 is 2 or more, $R_{41}$'s on a single benzene ring may be the same or different from each other, or may form a ring, if possible; $X_1$ represents an integer of 0 (zero) to 5; when $X_1$ is 2 or more, a series of $(R_{41})_{m1}$'s may be the same or different from each other; and $R_{51}$ represents an alkoxy group, an alkoxycarbonyl group, or an alkoxycarbonyloxy group, each of which has a group represented by the aforementioned P1, P2, P3, or P4, in which an alkoxy moiety of the group represented by $R_{51}$ may have an ether bond therein.

Further, the present invention resides in a composition, which comprises at least one of the above compounds.

Further, the present invention resides in an optically anisotropic material, which comprises any of the above compounds, or the above composition.

Further, the present invention resides in a liquid crystal display device, which comprises the above optically anisotropic material.

Other and further features and advantages of the invention will appear more fully from the following description.

DETAILED DESCRIPTION OF THE INVENTION

According to the present invention, there is provided the following means:

(1) A compound represented by formula (A):

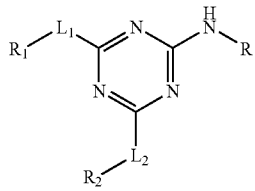

Formula (A)

wherein $L_1$ and $L_2$ each independently represent a single bond or a divalent linking group, $R_1$ and $R_2$ each independently represent a hydrogen atom or a substituent, and R represents a group having a polymerizable group;

(2) The compound according to the above Item (1), wherein the polymerizable group is a group that allows an addition polymerization reaction or a condensation polymerization reaction;

(3) A compound represented by formula (I):

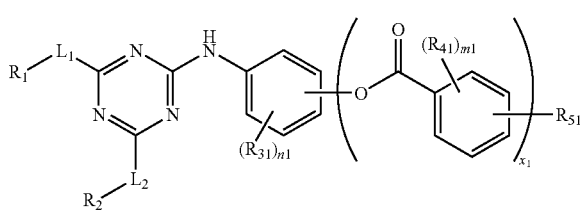

Formula (I)

wherein $L_1$ and $L_2$ each represent a single bond or a divalent linking group, which may be the same or different from each other; $R_1$ and $R_2$ each independently represent a hydrogen atom or a substituent; $R_{31}$, and $R_{41}$, each represent a substituent, which may be the same or different from each other; n1 represents an integer of 0 (zero) to 4; when n1 is 2 or more, $R_{31}$'s may be the same or different from each other, or $R_{31}$'s may form a ring, if possible; m1 represents an integer of 0 (zero) to 4; when m1 is 2 or more, $R_{41}$'s may be the same or different from each other, or $R_{41}$'s may form a ring, if possible; $X_1$ represents an integer of 0 (zero) to 5; when $X_1$ is 2 or more, $(R_{41})_{m1}$'s may be the same or different from each other; and $R_{51}$ represents an alkoxy group, an alkoxycarbonyl group, or an alkoxycarbonyloxy group, each of which has a group represented by P1, P2, P3, or P4, in which an alkoxy moiety of the group represented by $R_{51}$ may have an ether bond therein:

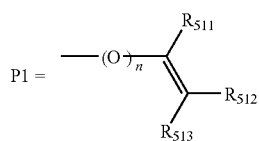

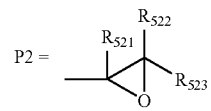

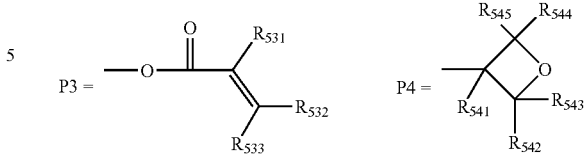

wherein $R_{511}$, $R_{512}$, $R_{513}$, $R_{521}$, $R_{522}$, $R_{523}$, $R_{531}$, $R_{532}$, $R_{533}$, $R_{541}$, $R_{542}$, $R_{543}$, $R_{544}$, and $R_{545}$ each independently represent a hydrogen atom or an alkyl group; and n represents 0 (zero) or 1;

(4) A compound represented by formula (II):

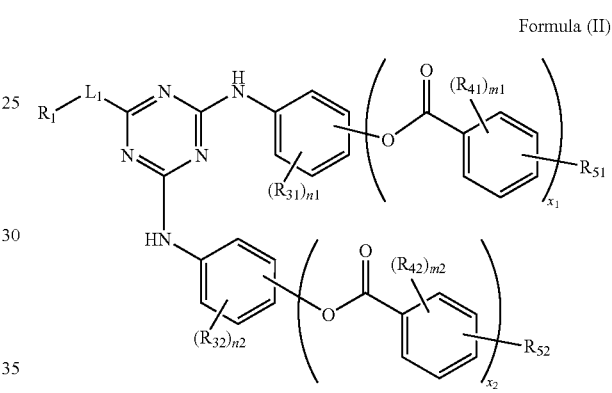

Formula (II)

wherein $L_1$ represents a single bond or a divalent linking group; $R_1$ represents a hydrogen atom or a substituent; $R_{31}$, $R_{32}$, $R_{41}$, and $R_{42}$ each represent a substituent, which may be the same or different from each other; n1 and n2 each independently represent an integer of 0 (zero) to 4; when n1 is 2 or more, $R_{31}$'s may be the same or different from each other, or $R_{31}$'s may form a ring, if possible; when n2 is 2 or more, $R_{32}$'s may be the same or different from each other, or $R_{32}$'s may form a ring, if possible; m1 and m2 each independently represent an integer of 0 (zero) to 4; when m1 is 2 or more, $R_{41}$'s may be the same or different from each other, or $R_{41}$'s may form a ring, if possible; when m2 is 2 or more, $R_{42}$'s may be the same or different from each other, or $R_{42}$'s may form a ring, if possible; $X_1$ and $X_2$ each independently represent an integer of 0 (zero) to 5; when $X_1$ is 2 or more, $(R_{41})_{m1}$'s may be the same or different from each other; when $X_2$ is 2 or more, $(R_{42})_{m2}$'s may be the same or different from each other; and $R_{51}$ and $R_{52}$ each independently represent an alkoxy group, an alkoxycarbonyl group, or an alkoxycarbonyloxy group, each of which has a group represented by the aforementioned P1, P2, P3, or P4, in which an alkoxy moiety of the group represented by $R_{51}$ or $R_{52}$ may have an ether bond therein;

(5) A compound represented by formula (III):

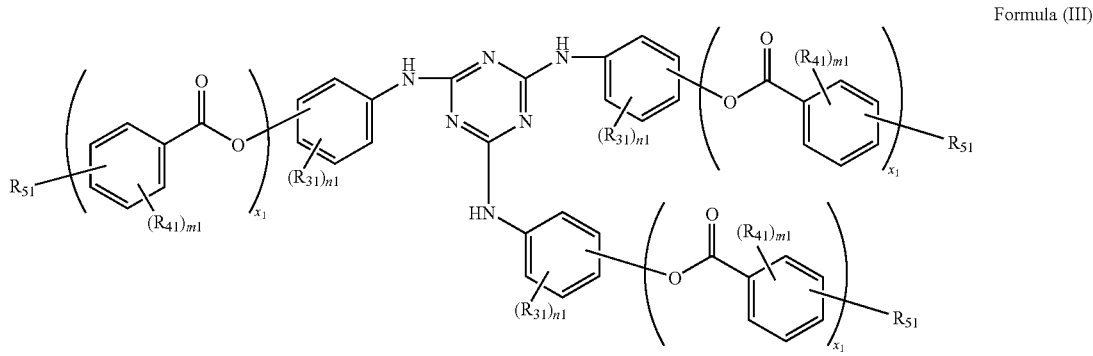

wherein $R_{31}$ and $R_{41}$ each represent a substituent, which may be the same or different from each other; n1 represents an integer of 0 (zero) to 4; when n1 is 2 or more, $R_{31}$'s on a single benzene ring may be the same or different from each other, or may form a ring, if possible; m1 represents an integer of 0 (zero) to 4; when m1 is 2 or more, $R_{41}$'s on a single benzene ring may be the same or different from each other, or may form a ring, if possible; $X_1$ represents an integer of 0 (zero) to 5; when $X_1$ is 2 or more, a series of $(R_{41})_{m1}$'s may be the same or different from each other; and $R_{51}$ represents an alkoxy group, an alkoxycarbonyl group, or an alkoxycarbonyloxy group, each of which has a group represented by the aforementioned P1, P2, P3, or P4, in which an alkoxy moiety of the group represented by $R_5$, may have an ether bond therein;

(6) The compound according to any one of the above Items (1) to (5), which is a compound having liquid crystallinity;

(7) A composition, comprising at least one compound according to any one of the above Items (1) to (6);

(8) An optically anisotropic material, comprising the compound according to any one of the above Items (1) to (6), or the composition according to the above Item (7);

(9) The optically anisotropic material according to the above Item (8), which has a refractive index difference (Δn) of 0.1 to 0.3; and

(10) A liquid crystal display device, comprising the optically anisotropic material according to the above Item (8) or (9).

Herein, the term "liquid crystallinity" that the compound of the present invention having liquid crystallinity exhibits means liquid crystallinity as described, for example, in "Ekisyo Binran (Liquid Crystal Handbook)", published by Maruzen. With respect to the liquid crystallinity, many phases are classified into groups, each of which has unique characteristics. The compound having liquid crystallinity in the present invention may have any of the phases as described in the handbook, and the compound of the present invention is preferably a compound showing nematic phase (N), or smectic phase (smectic A phase (SmA) or smectic C phase (SmC)).

Hereinafter, the present invention will be described in detail. The structural requirements/elements described below may be explained by embodying on the basis of some representative embodiments of the present invention, but the present invention is not limited to such embodiments.

Herein, in the present specification, a numerical range represented by using "to" means to include a range including numerical values described before and after "to" as the minimum value and the maximum value.

The compound represented by formula (A) (1,3,5-triazine compound) of the present invention is explained below.

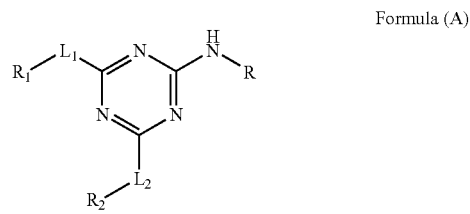

In formula (A), $L_1$ and $L_2$ each independently represent a single bond or a divalent linking group, $R_1$ and $R_2$ each independently represent a hydrogen atom or a substituent, and R represents a group having a polymerizable group.

In formula (A), $L_1$ and $L_2$ each independently represent a single bond or a divalent linking group. Specific examples of the divalent linking group include a group represented by —$NR_8$— (in which $R_8$ represents a hydrogen atom, an alkyl group which may have a substituent, or an aryl group which may have a substituent, and preferably represents a hydrogen atom), —$SO_2$—, —CO—, a substituted or unsubstituted alkylene group, a substituted or unsubstituted alkenylene group, a substituted or unsubstituted alkynylene group, a substituted or unsubstituted phenylene group, a substituted or unsubstituted biphenylene group, a substituted or unsubstituted naphthalene group, —O—, —S—, —SO—, and a group made by any combination of two or more thereof. More preferably, $L_1$ and $L_2$ are each a single bond, —$NR_8$—, —O—, or —S—, still more preferably a single bond or —$NR_8$—, most preferably —$NR_8$—.

In formula (A), $R_1$ and $R_2$ each independently represent a hydrogen atom or a substituent.

Specific examples of the substituent that can be applied in the present invention, include a halogen atom (e.g., a fluorine atom, a chlorine atom, a bromine atom, an iodine atom), an alkyl group (preferably a substituted or unsubstituted alkyl group having 1 to 30 carbon atoms, e.g., a methyl group, an ethyl group, a n-propyl group, an isopropyl group, a t-butyl group, a n-octyl group, a 2-ethylhexyl group), a cycloalkyl group (preferably a substituted or unsubstituted cycloalkyl group having 3 to 30 carbon atoms, e.g., a cyclohexyl group, a cyclopentyl group, a 4-n-dodecylcyclohexyl group), a bicycloalkyl group (preferably a substituted or unsubstituted bicycloalkyl group having 5 to 30 carbon atoms, that is, a monovalent group obtained by removing one hydrogen atom from a bicycloalkane having 5 to 30 carbon atoms, e.g., a bicyclo[1,2,2]heptane-2-yl group, a bicyclo[2,2,2]octane-3-yl group), an alkenyl group (preferably a substituted or unsubstituted alkenyl group having 2 to 30 carbon atoms, e.g., a vinyl group, an allyl group), a cycloalkenyl group (preferably a substituted or unsubstituted cycloalkenyl group having 3 to 30 carbon atoms, that is, a monovalent group obtained by removing one hydrogen atom from a cycloalkene having 3 to 30 carbon atoms, e.g., a 2-cyclopentene-1-yl group, a 2-cyclohexene-1-yl group), a bicycloalkenyl group (a substituted or unsubstituted bicycloalkenyl group, preferably a substituted or unsubstituted bicycloalkenyl group having 5 to 30 carbon atoms, that is, a monovalent group obtained by removing one hydrogen atom from a bicycloalkene having one double bond, e.g., a bicyclo[2,2,1]hepto-2-ene-1-yl group, a bicyclo[2,2,2]octo-2-ene-4-yl group), an alkynyl group (preferably a substituted or unsubstituted alkynyl group having 2 to 30 carbon atoms, e.g., an ethynyl group, a propargyl group), an aryl group (preferably a substituted or unsubstituted aryl group having 6 to 30 carbon atoms, e.g., a phenyl group, a p-tolyl group, a naphthyl group), a heterocyclic group (preferably a 5- or 6-membered substituted or unsubstituted heterocyclic group, that is a monovalent group obtained by removing one hydrogen atom from an aromatic or non-aromatic heterocyclic compound, more preferably a 5- or 6-membered aromatic heterocyclic group having 3 to 30 carbon atoms, e.g., a 2-furyl group, a 2-thienyl group, a 2-pyrimidinyl group, a 2-benzothiazolyl group), a cyano group, a hydroxyl group, a nitro group, a carboxyl group, an alkoxy group (preferably a substituted or unsubstituted alkoxy group having 1 to 30 carbon atoms, e.g., a methoxy group, an ethoxy group, an isopropoxy group, a t-butoxy group, a n-octyloxy group, a 2-methoxyethoxy group), an aryloxy group (preferably a substituted or unsubstituted aryloxy group having 6 to 30 carbon atoms, e.g., a phenoxy group, a 2-methylphenoxy group, a 4-tert-butylphenoxy group, a 3-nitrophenoxy group, a 2-tetradecanoylaminophenoxy group), a silyloxy group (preferably a silyloxy group having 3 to 20 carbon atoms, e.g., a trimethylsilyloxy group, a tert-butyldimethylsilyloxy group), a heterocyclic oxy group (preferably a substituted or unsubstituted heterocyclic oxy group having 2 to 30 carbon atoms, e.g., a 1-phenyltetrazole-5-oxy group, a 2-tetrahydropyranyloxy group), an acyloxy group (preferably a formyloxy group, a substituted or unsubstituted alkylcarbonyloxy group having 2 to 30 carbon atoms, or a substituted or unsubstituted arylcarbonyloxy group having 6 to 30 carbon atoms, e.g., a formyloxy group, an acetyloxy group, a pivaloyloxy group, a stearoyloxy group, a benzoyloxy group, a p-methoxyphenylcarbonyloxy group), a carbamoyloxy group (preferably a substituted or unsubstituted carbamoyloxy group having 1 to 30 carbon atoms, e.g., an N,N-dimethylcarbamoyloxy group, an N,N-diethylcarbamoyloxy group, a morpholinocarbonyloxy group, an N,N-di-n-octylaminocarbonyloxy group, an N-n-octylcarbamoyloxy group), an alkoxycarbonyloxy group (preferably a substituted or unsubstituted alkoxycarbonyloxy group having 2 to 30 carbon atoms, e.g., a methoxycarbonyloxy group, an ethoxycarbonyloxy group, a tert-butoxycarbonyloxy group, a n-octylcarbonyloxy group), an aryloxycarbonyloxy group (preferably a substituted or unsubstituted aryloxycarbonyloxy group having 7 to 30 carbon atoms, e.g., a phenoxycarbonyloxy group, a p-methoxyphenoxycarbonyloxy group, a p-n-hexadecyloxyphenoxycarbonyloxy group), an amino group (preferably an amino group, a substituted or unsubstituted alkylamino group having 1 to 30 carbon atoms, or a substituted or unsubstituted anilino group having 6 to 30 carbon atoms, e.g., an amino group, a methylamino group, a dimethylamino group, an anilino group, an N-methyl-anilino group, a diphenylamino group), an acylamino group (preferably a formylamino group, a substituted or unsubstituted alkylcarbonylamino group having 1 to 30 carbon atoms, or a substituted or unsubstituted arylcarbonylamino group having 6 to 30 carbon atoms, e.g., a formylamino group, an acetylamino group, a pivaloylamino group, a lauroylamino group, a benzoylamino group), an aminocarbonylamino group (preferably a substituted or unsubstituted aminocarbonylamino group having 1 to 30 carbon atoms, e.g., a carbamoylamino group, an N,N-dimethylaminocarbonylamino group, an N,N-diethylaminocarbonylamino group, a morpholinocarbonylamino group), an alkoxycarbonylamino group (preferably a substituted or unsubstituted alkoxycarbonylamino group having 2 to 30 carbon atoms, e.g., a methoxycarbonylamino group, an ethoxycarbonylamino group, a tert-butoxycarbonylamino group, a n-octadecyloxycarbonylamino group, an N-methyl-methoxycarbonylamino group), an aryloxycarbonylamino group (preferably a substituted or unsubstituted aryloxycarbonylamino group having 7 to 30 carbon atoms, e.g., a phenoxycarbonylamino group, a p-chlorophenoxycarbonylamino group, a m-n-octyloxyphenoxycarbonylamino group), a sulfamoylamino group (preferably a substituted or unsubstituted sulfamoylamino group having 0 (zero) to 30 carbon atoms, e.g., a sulfamoylamino group, an N,N-dimethylaminosulfonylamino group, an N-n-octylaminosulfonylamino group), an alkyl- or arylsulfonylamino group (preferably a substituted or unsubstituted alkylsulfonylamino group having 1 to 30 carbon atoms, or a substituted or unsubstituted arylsulfonylamino group having 6 to 30 carbon atoms, e.g., a methylsulfonylamino group, a butylsulfonylamino group, a phenylsulfonylamino group, a 2,3,5-trichlorophenylsulfonylamino group, a p-methylphenylsulfonylamino group), a mercapto group, an alkylthio group (preferably a substituted or unsubstituted alkylthio group having 1 to 30 carbon atoms, e.g., a methylthio group, an ethylthio group, a n-hexadecylthio group), an arylthio group (preferably a substituted or unsubstituted arylthio group having 6 to 30 carbon atoms, e.g., a phenylthio group, a p-chlorophenylthio group, a m-methoxyphenylthio group), a heterocyclic thio group (preferably a substituted or unsubstituted heterocyclic thio group having 2 to 30 carbon atoms, e.g., a 2-benzothiazolylthio group, a 1-phenyltetrazol-5-yl thio group), a sulfamoyl group (preferably a substituted or unsubstituted sulfamoyl group having 0 (zero) to 30 carbon atoms, e.g., an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, an N—(N'-phenylcarbamoyl)sulfamoyl group), a sulfo group, an alkyl- or aryl-sulfinyl group (preferably a substituted or unsubstituted alkylsulfinyl group having 1 to 30 carbon atoms, or a substituted or unsubstituted arylsulfinyl group having 6 to 30 carbon atoms, e.g., a methylsulfinyl group, an ethylsulfinyl group, a phenylsulfinyl group, a p-methylphenylsulfinyl group), an alkyl- or aryl-sulfonyl group (preferably a substituted or unsubstituted alkylsulfonyl group having 1 to 30 carbon atoms, or a substituted or unsubstituted arylsulfonyl group having 6 to 30 carbon atoms, e.g., a methylsulfonyl group, an ethylsulfonyl group, a phenylsulfonyl group, a p-methylphenylsulfonyl group), an acyl group (preferably a formyl group, a substituted or unsubstituted alkylcarbonyl group having 2 to 30 carbon atoms, or a substituted or unsubstituted arylcarbonyl group having 7 to 30 carbon atoms, e.g., an acetyl group, a pivaloylbenzoyl group), an aryloxycarbonyl group (preferably a substituted or unsubstituted aryloxycarbonyl group having 7 to 30 carbon atoms, e.g., a phenoxy-carbonyl group, an o-chlorophenoxycarbonyl group, a m-nitrophenoxycarbonyl group, a p-tert-butylphenoxycarbonyl group), an alkoxycarbonyl group (preferably a substituted or unsubstituted alkoxycarbonyl group having 2 to 30 carbon atoms, e.g., a methoxycarbonyl group, an ethoxycarbonyl group, a tert-butoxycarbonyl group, a n-octadecyloxycarbonyl group), a carbamoyl group (preferably a substituted or unsubstituted carbamoyl group having 1 to 30 carbon atoms, e.g., a carbamoyl group, an N-methylcarbamoyl group, an N,N-dimethylcarbamoyl group, an N,N-di-n-octylcarbamoyl group, an N-(methylsulfonyl)carbamoyl group), an aryl- or heterocyclic-azo group (preferably a substituted or unsubstituted arylazo group having 6 to 30 carbon atoms, or a substituted or unsubstituted heterocyclic azo group having 3 to 30 carbon atoms, e.g., a phenylazo group, a p-chlorophenylazo group, a 5-ethylthio-1,3,4-thiadiazole-2-yl azo group), an imido group (preferably an N-succinimido group, an N-phthalimido group), a phosphino group (preferably a substituted or unsubstituted phosphino group having 2 to 30 carbon atoms, e.g., a dimethylphosphino group, a diphenylphosphino group, a methylphenoxyphosphino group), a phosphinyl group (preferably a substituted or unsubstituted phosphinyl group having 2 to 30 carbon atoms, e.g., a phosphinyl group, a dioctyloxyphosphinyl group, a diethoxyphosphinyl group), a phosphinyloxy group (preferably a substituted or unsubstituted phosphinyloxy group having 2 to 30 carbon atoms, e.g., a diphenoxyphosphinyloxy group, a dioctyloxyphosphinyloxy group), a phosphinylamino group (preferably a substituted or unsubstituted phosphinylamino group having 2 to 30 carbon atoms, e.g., a dimethoxyphosphinylamino group, a dimethylaminophosphinylamino group), and a silyl group (preferably a substituted or unsubstituted silyl group having 3 to 30 carbon atoms, e.g., a trimethylsilyl group, a tert-butyldimethylsilyl group, a phenyldimethylsilyl group).

Of the above-mentioned substituents, those having a hydrogen atom(s) may be further substituted with any of the above groups in place of the hydrogen atom(s). Examples of such a functional group include an alkylcarbonylaminosulfonyl group, an arylcarbonylaminosulfonyl group, an alkylsulfonylaminocarbonyl group, and an arylsulfonylaminocarbonyl group. Specific examples thereof include a methylsulfonylaminocarbonyl group, a p-methylphenylsulfonylaminocarbonyl group, an acetylaminosulfonyl group, and a benzoylaminosulfonyl group.

$R_1$ and $R_2$ each are preferably a chlorine atom, an alkyl group, an alkenyl group, an aryl group, a heterocyclic group, a hydroxyl group, a carboxyl group, an alkoxy group, an aryloxy group, an acyloxy group, or an amino group; and more preferably a chlorine atom, an alkyl group, an aryl group, a hydroxyl group, or an amino group.

In formula (A), R represents a group having a polymerizable group.

The polymerizable group which R has, is preferably a group that is able to undergo an addition polymerization reaction or a condensation polymerization reaction. Such a polymerizable group is preferably a polymerizable ethylenically unsaturated group or a ring-opening polymerizable group.

The compound represented by formula (A) is preferably a polymerizable compound represented by formula (I):

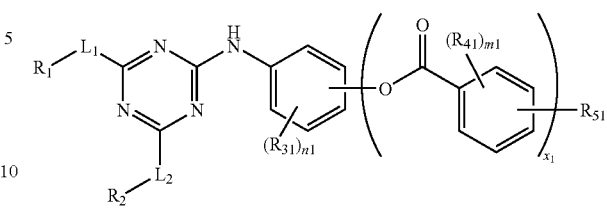

Formula (I)

wherein $L_1$ and $L_2$ each represent a single bond or a divalent linking group, which may be the same or different from each other; $R_1$ and $R_2$ each independently represent a hydrogen atom or a substituent; $R_{31}$ and $R_{41}$ each represent a substituent, which may be the same or different from each other; n1 represents an integer of 0 to 4; when n1 is 2 or more, $R_{31}$'s may be the same or different from each other, or $R_{31}$'s may form a ring, if possible; m1 represents an integer of 0 to 4; when m1 is 2 or more, $R_{41}$'s may be the same or different from each other, or $R_{41}$'s may form a ring, if possible; $X_1$ represents an integer of 0 to 5; when $X_1$ is 2 or more, $(R_{41})_{m1}$'s may be the same or different from each other; and $R_{51}$ represents an alkoxy group, an alkoxycarbonyl group, or an alkoxycarbonyloxy group, each of which has a group represented by P1, P2, P3, or P4, in which an alkoxy moiety of the group represented by $R_{51}$ may have an ether bond therein:

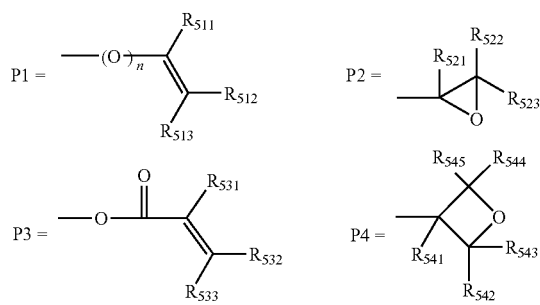

wherein $R_{511}$, $R_{512}$, $R_{513}$, $R_{521}$, $R_{522}$, $R_{523}$, $R_{531}$, $R_{532}$, $R_{533}$, $R_{541}$, $R_{542}$, $R_{543}$, $R_{544}$, and $R_{545}$ each independently represent a hydrogen atom or an alkyl group; and n represents 0 (zero) or 1.

In formula (I), $L_1$ and $L_2$ have the same meanings as those in the formula (A), and the preferable ranges thereof are also the same as those in the formula (A).

In formula (I), $R_1$ and $R_2$ have the same meanings as those in the formula (A), and the preferable ranges thereof are also the same as those in the formula (A).

In formula (I), $R_{31}$ and $R_{41}$ each independently represent a substituent. Examples of the substituent include those given as examples of the substituent represented by $R_1$ or $R_2$ in the formula (A).

$R_{31}$ is preferably a halogen atom, an alkyl group, a cyano group, a hydroxyl group, an alkoxy group, an aryloxy group, an acyloxy group, an alkoxycarbonyloxy group, an amino group, or an acylamino group; and more preferably a halogen atom, an alkyl group, a cyano group, a hydroxyl group, an alkoxy group, an acyloxy group, an alkoxycarbonyl group, or an alkoxycarbonyloxy group.

$R_{41}$ is preferably a halogen atom, an alkyl group, an alkenyl group, an alkynyl group, a cyano group, a hydroxyl group, a nitro group, a carboxyl group, an alkoxy group, an aryloxy group, an acyloxy group, a carbamoyloxy group, an alkoxycarbonyloxy group, an aryloxycarbonyloxy group, an amino group, an acylamino group, an alkoxycarbonylamino group, an aryloxycarbonylamino group, a sulfamoylamino group, an alkyl- or aryl-sulfonylamino group, a mercapto group, an alkylthio group, an arylthio group, or a sulfamoyl group; and more preferably a halogen atom, an alkyl group, a cyano group, a hydroxyl group, an alkoxy group, an acyloxy group, an alkoxycarbonyl group, or an alkoxycarbonyloxy group.

In formula (I), n1 represents an integer of 0 to 4. When n1 is 2 or more, $R_{31}$'s may be the same or different from each other, or $R_{31}$'s may, if possible, bond together to form a ring. n1 is preferably an integer of 0 to 2.

In formula (I), m1 represents an integer of 0 to 4. When m1 is 2 or more, $R_{41}$'s may be the same or different from each other, or $R_{41}$'s may, if possible, bond together to form a ring. m1 is preferably an integer of 0 to 3.

In formula (I), $X_1$ represents an integer of 0 to 5. When $X_1$ is 2 or more, $(R_{41})_{m1}$'s may be the same or different from each other. $X_1$ is preferably an integer of 0 to 3, and more preferably 0, 1, or 2.

When $X_1$ is not 0, the substituted benzoyloxy group that is a group on the aminophenyl group, is preferably in the meta- or para-position relative to the amino group, most preferably in the para-position.

In formula (I), $R_{51}$ represents an alkoxy group, an alkoxycarbonyl group, or an alkoxycarbonyloxy group, each of which has P1, P2, P3, or P4 as a substituent thereon, in which an alkoxy moiety of the group represented by $R_{51}$ may have an ether bond(s) in an alkylene moiety which constitutes the alkoxy moiety.

When $X_1$ is 0, the $R_{51}$ that is a group on the aminophenyl group, is preferably in the meta- or para-position relative to the amino group on the benzene ring. When $X_1$ is not 0, the $R_{51}$, that is a group on the benzoyloxy group, is preferably in the meta- or para-position relative to the carbonyl group on the benzene ring.

In the group represented by P1, $R_{511}$, $R_{512}$ and $R_{513}$ each independently represent a hydrogen atom or an alkyl group.

The group to give the alkoxy, alkoxycarbonyl or alkoxycarbonyloxy group whose terminal is substituent with the group P1, represents an alkyleneoxy group (e.g. an alkyleneoxy group, such as ethyleneoxy, propyleneoxy, butyleneoxy, pentyleneoxy, hexyleneoxy, and heptyleneoxy; and an ether bond-containing substituted alkyleneoxy group, such as ethyleneoxyethoxy), an alkyleneoxycarbonyloxy group (e.g. an alkyleneoxycarbonyloxy group, such as ethyleneoxycarbonyloxy, propyleneoxycarbonyloxy, butyleneoxycarbonyloxy, pentyleneoxycarbonyloxy, hexyleneoxycarbonyloxy, and heptyleneoxycarbonyloxy; and an ether bond-containing substituted alkyleneoxycarbonyloxy group, such as ethyleneoxyethoxycarbonyloxy), or an alkyleneoxycarbonyl group (e.g. an alkyleneoxycarbonyl group, such as ethyleneoxycarbonyl group, propyleneoxycarbonyl group, butyleneoxycarbonyl group, pentyleneoxycarbonyl group, hexyleneoxycarbonyl group, and heptyleneoxycarbonyl group; or an ether bond-containing substituted alkyleneoxycarbonyl group, such as ethyleneoxyethoxycarbonyl group). The terminal substituent P1 may be directly bonded to an aromatic ring. The same is applied to the cases where the terminal substituent is P2, P3, or P4.

n represents an integer of 0 to 1, preferably n is 1. Where n is 1, the terminal substituent P1 of $R_{51}$ represents a substituted or unsubstituted vinyl ether group. The groups $R_{511}$ and $R_{513}$ of the group P1 each independently represent a hydrogen atom, or an alkyl group (e.g. methyl, ethyl, n-propyl, isopropyl, n-butyl, pentyl, hexyl, heptyl, octyl, and nonyl; and preferably a lower alkyl group, such as methyl and ethyl, more preferably methyl). Preferable examples of combination include those in which $R_{511}$ represents a methyl group and $R_{513}$ represents a hydrogen atom, or $R_{511}$ and $R_{513}$ each represent a hydrogen atom.

The group $R_{512}$ represents a hydrogen atom, or a substituted or unsubstituted alkyl group (e.g. methyl, ethyl, n-propyl, isopropyl, n-butyl, pentyl, hexyl, heptyl, octyl, nonyl, 2-chloroethyl, 3-methoxyethyl, and methoxyethoxyethyl; and preferably a lower alkyl group, such as methyl and ethyl, more preferably methyl). The group $R_{512}$ is preferably a hydrogen atom or a lower alkyl group, more preferably a hydrogen atom. Therefore, it is preferable to use, as the group P1, an unsubstituted vinyloxy group, which is a functional group high in polymerization activity in general.

The terminal substituent P2 of $R_{51}$ represents a substituted or unsubstituted oxirane group. The groups $R_{521}$ and $R_{522}$ of the group P2 each independently represent a hydrogen atom, or an alkyl group (e.g. methyl, ethyl, n-propyl, isopropyl, n-butyl, pentyl, hexyl, heptyl, octyl, and nonyl; and preferably a lower alkyl group, such as methyl and ethyl, more preferably methyl). It is preferable that $R_{521}$ and $R_{522}$ each are a hydrogen atom.

The group $R_{523}$ represents a hydrogen atom, or a substituted or unsubstituted alkyl group (e.g. methyl, ethyl, n-propyl, isopropyl, n-butyl, pentyl, hexyl, heptyl, octyl, nonyl, 2-chloroethyl, 3-methoxyethyl, and methoxyethoxyethyl; and preferably a lower alkyl group, such as methyl and ethyl, more preferably methyl). The group $R_{523}$ is preferably a hydrogen atom, or a lower alkyl group, such as methyl, ethyl, or n-propyl.

The terminal substituent P3 of $R_{51}$ represents a substituted or unsubstituted acryl group (acryloyloxy group). The groups $R_{531}$ and $R_{533}$ of the group P3 each independently represent a hydrogen atom, or an alkyl group (e.g. methyl, ethyl, n-propyl, isopropyl, n-butyl, pentyl, hexyl, heptyl, octyl, and nonyl; and preferably a lower alkyl group, such as methyl and ethyl, more preferably methyl). Preferable examples of combination include those in which $R_{531}$ represents a methyl group and $R_{533}$ represents a hydrogen atom, or $R_{531}$ and $R_{533}$ each represent a hydrogen atom.

The group $R_{532}$ represents a hydrogen atom, or a substituted or unsubstituted alkyl group (e.g. methyl, ethyl, n-propyl, isopropyl, n-butyl, pentyl, hexyl, heptyl, octyl, nonyl, 2-chloroethyl, 3-methoxyethyl, and methoxyethoxyethyl; and preferably a lower alkyl group, such as methyl and ethyl, more preferably methyl). The group $R_{532}$ is preferably a hydrogen atom. Therefore, it is preferable to use, as the group P3, a functional group high in polymerization activity in general, such as an unsubstituted acryloxy group, a methacryloxy group, or a crotonyloxy group.

The terminal substituent P4 of $R_{51}$ is a polymerizable group, and represents a substituted or unsubstituted oxetane group. The groups $R_{542}$, $R_{543}$, $R_{544}$, and $R_{545}$ on the group P4 each independently represent a hydrogen atom, or an alkyl group (e.g. methyl, ethyl, n-propyl, isopropyl, n-butyl, pentyl, hexyl, heptyl, octyl, and nonyl; and preferably a lower alkyl group, such as methyl and ethyl, more preferably methyl). It is preferable that $R_{542}$, $R_{543}$, $R_{544}$, and $R_{545}$ each are a hydrogen atom.

$R_{541}$ represents a hydrogen atom, or a substituted or unsubstituted alkyl group (e.g. methyl, ethyl, n-propyl, isopropyl, n-butyl, pentyl, hexyl, heptyl, octyl, nonyl, 2-chloroethyl, 3-methoxyethyl, and methoxyethoxyethyl; and preferably a lower alkyl group, such as methyl and ethyl, more preferably methyl). $R_{541}$ is preferably a hydrogen atom, or a lower alkyl group, such as methyl, ethyl, or n-propyl.

The compound represented by formula (A) is also preferably a polymerizable compound represented by formula (II):

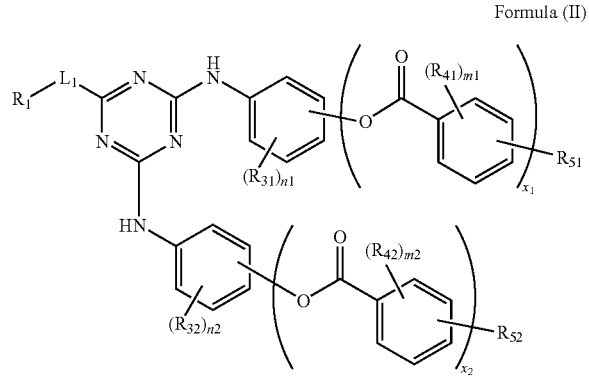

Formula (II)

wherein $L_1$ represents a single bond or a divalent linking group; $R_1$ represents a hydrogen atom or a substituent; $R_{31}$, $R_{32}$, $R_{41}$ and $R_{42}$ each represent a substituent, which may be the same or different from each other; n1 and n2 each independently represent an integer of 0 to 4; when n1 is 2 or more, $R_{31}$'s may be the same or different from each other, or $R_{31}$'s may form a ring, if possible; when n2 is 2 or more, $R_{32}$'s may be the same or different from each other, or $R_{32}$'s may form a ring, if possible; m1 and m2 each independently represent an integer of 0 to 4; when m1 is 2 or more, $R_{41}$'s may be the same or different from each other, or $R_{41}$'s may form a ring, if possible; when m2 is 2 or more, $R_{42}$'s may be the same or different from each other, or $R_{42}$'s may form a ring, if possible; $X_1$ and $X_2$ each independently represent an integer of 0 to 5; when $X_1$ is 2 or more, $(R_{41})_{m1}$'s may be the same or different from each other; when $X_2$ is 2 or more, $(R_{42})_{m2}$'s may be the same or different from each other; and $R_{51}$ and $R_{52}$ each independently represent an alkoxy group, an alkoxycarbonyl group, or an alkoxycarbonyloxy group, each of which has a group represented by the aforementioned P1, P2, P3, or P4, in which an alkoxy moiety of the group represented by $R_{51}$ or $R_{52}$ may have an ether bond therein.

In formula (II), $L_1$, $R_1$, $R_{31}$, $R_{41}$, $R_{51}$, n1, m1, $X_1$, P1, P2, P3 and P4 have the same meanings as those in the formula (I), and the preferable ranges thereof are also the same as those in the formula (I).

In formula (II), $R_{32}$ represents a substituent. Examples of the substituent represented by $R_{32}$ include those given as examples of the substituent represented by $R_{31}$, and the preferable ranges thereof are also the same as those of $R_{31}$.

In formula (II), $R_{42}$ represents a substituent. Examples of the substituent represented by $R_{42}$ include those given as examples of the substituent represented by $R_{41}$, and the preferable ranges thereof are also the same as those of $R_{41}$.

In formula (II), n2 represents an integer of 0 to 4. When n2 is 2 or more, $R_{32}$'s may be the same or different from each other, or $R_{32}$'s may, if possible, bond together to form a ring. n2 is preferably an integer of 0 to 2.

In formula (II), m2 represents an integer of 0 to 4. When m2 is 2 or more, $R_{42}$'s may be the same or different from each other, or $R_{42}$'s may, if possible, bond together to form a ring. m2 is preferably an integer of 0 to 3.

In formula (II), $X_2$ represents an integer of 0 to 5. When $X_2$ is 2 or more, $(R_{42})_{m2}$'s may be the same or different from each other. $X_2$ is preferably an integer of 0 to 3, and more preferably 0, 1, or 2.

When $X_2$ is not 0, the substituted benzoyloxy group that is a group on the aminophenyl group, is preferably in the meta- or para-position relative to the amino group, most preferably in the para-position.

In formula (II), $R_{52}$ represents an alkoxy group, an alkoxycarbonyl group, or an alkoxycarbonyloxy group, each of which has P1, P2, P3, or P4 as a substituent thereon, in which an alkoxy moiety of the group represented by $R_{51}$ or $R_{52}$ may have an ether bond(s) in an alkylene moiety which constitutes the alkoxy moiety.

When $X_2$ is 0, the $R_{52}$ that is a group on the aminophenyl group, is preferably in the meta- or para-position relative to the amino group on the benzene ring. When $X_2$ is not 0, the $R_{52}$ that is a group on the benzoyloxy group, is preferably in the meta- or para-position relative to the carbonyl group on the benzene ring.

$R_{52}$ and $R_{51}$ may be the same or different from each other, preferably they are the same.

The compound represented by formula (A) is more preferably a polymerizable compound represented by formula (III):

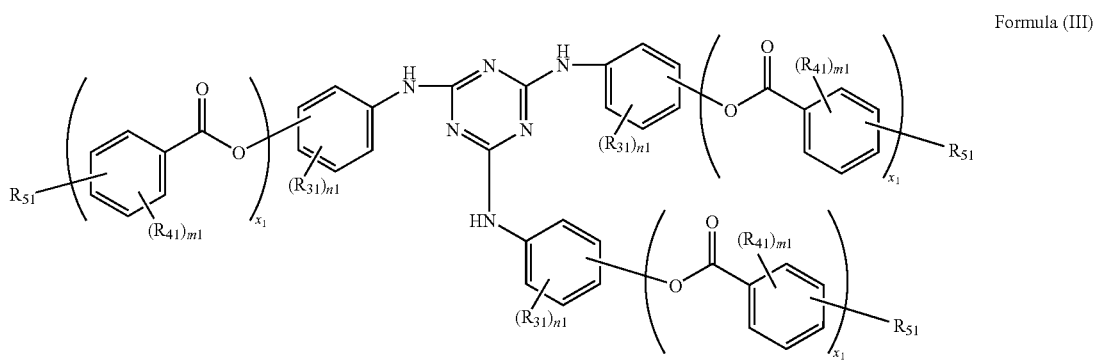

Formula (III)

wherein $R_{31}$ and $R_{41}$ each represent a substituent, which may be the same or different from each other; n1 represents an integer of 0 to 4; when n1 is 2 or more, $R_{31}$'s on a single benzene ring may be the same or different from each other, or may form a ring, if possible; m1 represents an integer of 0 to 4; when m1 is 2 or more, $R_{41}$'s on a single benzene ring may be the same or different from each other, or may form a ring, if possible; $X_1$ represents an integer of 0 to 5; when $X_1$ is 2 or more, a series of $(R_{41})_{m1}$'s may be the same or different from each other; and $R_{51}$ represents an alkoxy group, an alkoxycarbonyl group, or an alkoxycarbonyloxy group, each of which has a group represented by the aforementioned P1, P2, P3, or P4, in which an alkoxy moiety of the group represented by $R_{51}$ may have an ether bond therein.

In formula (III), $R_{31}$, $R_{41}$, $R_{51}$, n1, m1, $X_1$, $X_2$, P1, P2, P3, and P4 have the same meanings as those in the formula (I), and the preferable ranges thereof are also the same as those in the formula (I).

Specific examples of the polymerizable compound of the present invention as represented by formula (A), (I), (II), or (III) are shown below, but the present invention is not meant to be limited to those. In the following description, when the exemplified compounds shown below are referred to, the number "X" put in parentheses, that is, "(X)" attached to the exemplified compound, is utilized to express the compound as "Exemplified compound (X)", unless otherwise specified:

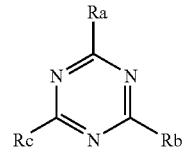

wherein Ra, Rb and Rc each represent the group, as shown in Table 1 below.

TABLE 1

| Exemplified compound | Ra | Rb | Rc |
| --- | --- | --- | --- |
| (1) | T-1 | T-1 | T-1 |
| (2) | T-2 | T-2 | T-2 |
| (3) | T-3 | T-3 | T-3 |
| (4) | T-4 | T-4 | T-4 |
| (5) | T-5 | T-5 | T-5 |
| (6) | T-6 | T-6 | T-6 |
| (7) | T-7 | T-7 | T-7 |
| (8) | T-8 | T-8 | T-8 |
| (9) | T-9 | T-9 | T-9 |
| (10) | T-10 | T-10 | T-10 |
| (11) | T-11 | T-11 | T-11 |
| (12) | T-12 | T-12 | T-12 |
| (13) | T-13 | T-13 | T-13 |
| (14) | T-14 | T-14 | T-14 |
| (15) | T-15 | T-15 | T-15 |
| (16) | T-15 | T-15 | T-43 |
| (17) | T-15 | T-15 | T-50 |
| (18) | T-16 | T-16 | T-16 |
| (19) | T-17 | T-17 | T-17 |
| (20) | T-18 | T-18 | T-18 |
| (21) | T-18 | T-18 | T-43 |
| (22) | T-18 | T-18 | T-44 |
| (23) | T-18 | T-18 | T-45 |
| (24) | T-18 | T-18 | T-46 |
| (25) | T-18 | T-18 | T-47 |
| (26) | T-18 | T-18 | T-48 |
| (27) | T-18 | T-18 | T-49 |
| (28) | T-18 | T-18 | T-50 |
| (29) | T-18 | T-18 | T-29 |
| (30) | T-18 | T-18 | T-30 |
| (31) | T-18 | T-18 | T-3 |
| (32) | T-19 | T-19 | T-19 |
| (33) | T-20 | T-20 | T-20 |
| (34) | T-21 | T-21 | T-21 |
| (35) | T-22 | T-22 | T-22 |
| (36) | T-23 | T-23 | T-23 |
| (37) | T-24 | T-24 | T-24 |
| (38) | T-25 | T-25 | T-25 |
| (39) | T-26 | T-26 | T-26 |
| (40) | T-27 | T-27 | T-27 |
| (41) | T-27 | T-27 | T-46 |
| (42) | T-27 | T-27 | T-47 |
| (43) | T-27 | T-46 | T-46 |
| (44) | T-28 | T-28 | T-28 |
| (45) | T-29 | T-29 | T-29 |
| (46) | T-30 | T-30 | T-30 |
| (47) | T-31 | T-31 | T-31 |
| (48) | T-32 | T-32 | T-32 |
| (49) | T-33 | T-33 | T-33 |
| (50) | T-34 | T-34 | T-34 |
| (51) | T-35 | T-35 | T-35 |
| (52) | T-36 | T-36 | T-36 |
| (53) | T-37 | T-37 | T-37 |
| (54) | T-38 | T-38 | T-38 |
| (55) | T-39 | T-39 | T-39 |
| (56) | T-40 | T-40 | T-40 |
| (57) | T-41 | T-41 | T-41 |
| (58) | T-42 | T-42 | T-42 |

TABLE 1-continued
| Exemplified compound | Ra | Rb | Rc |
|---|---|---|---|
| (59) | T-51 | T-51 | T-51 |
| (60) | T-52 | T-52 | T-52 |
| (61) | T-53 | T-53 | T-53 |
| (62) | T-54 | T-54 | T-54 |
| (63) | T-57 | T-57 | T-57 |
| (64) | T-18 | T-18 | T-55 |
| (65) | T-18 | T-18 | T-56 |
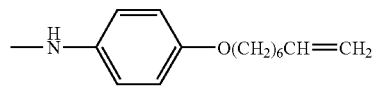
(T-1)
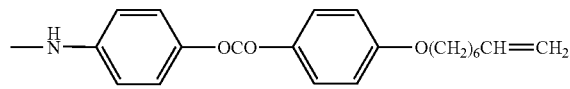
(T-2)
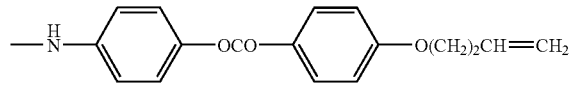
(T-3)
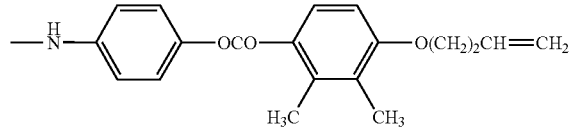
(T-4)
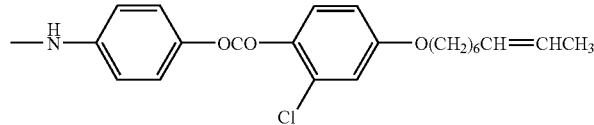
(T-5)
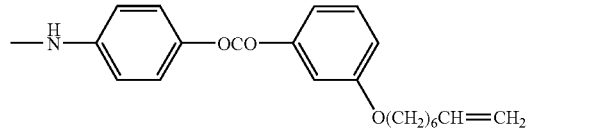
(T-6)
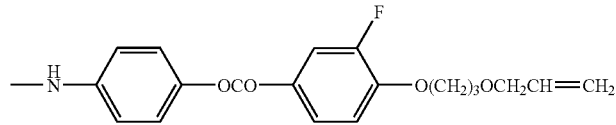
(T-7)
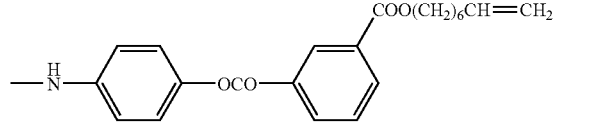
(T-8)
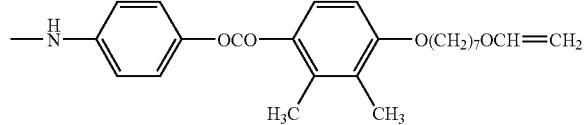
(T-9)
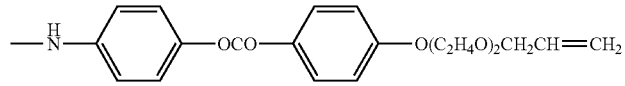
(T-10)
(T-11)

TABLE 1-continued

| Exemplified compound | Ra | Rb | Rc |
|---|---|---|---|

—NH—C6H4—OCO—C6H3(CH3)—O(CH2)6OCH=CH2 (T-12)

—NH—C6H4—OCO—C6H4—O(CH2)5OCH=CHC2H5 (T-13)

—NH—C6H4—OCO—C6H3(CH3)—O(C2H4O)2OCH=CH2 (T-14)

—NH—C6H4—OCO—C6H4—OCO—C6H4—O(CH2)4CH=CH2 (T-15)

—HN—C6H4—O(CH2)6OCOCH=CH2 (T-16)

—HN—C6H4—OCOO(CH2)4OCOCH=CH2 (T-17)

—HN—C6H4—COO(CH2)4OCOCH=CH2 (T-18)

—NH—C6H4—OCO—C6H4—O(CH2)4OCOCH=CH2 (T-19)

—NH—C6H4—OCO—C6H3(CH3)—O(CH2)5OCOCH=CHCH3 (T-20)

—NH—C6H4—OCO—C6H4(O(CH2)4OCOCH=CH2)— (T-21)

—NH—C6H4—OCO—C6H2(CH3)2—O(CH2)7OCOCH=CH2 (T-22)

—NH—C6H4—OCO—C6H4(COO(CH2)4OCOCH=CH2)— (T-23)

—NH—C6H4—OCO—C6H4—O(CH2)6OCOC(CH3)=C(CH3)2

TABLE 1-continued

| Exemplified compound | Ra | Rb | Rc |
|---|---|---|---|

(T-24)

—NH—C₆H₄—OCO—C₆H₃(CH₃)—O(CH₂)₄OCOCH=CHCH₃

(T-25)

—NH—C₆H₄—OCO—C₆H₄—OCO—C₆H₃(Br)—O(CH₂)₄OCOCH=CH₂

(T-26)

—NH—C₆H₄—OCO—C₆H₃(CN)—O(CH₂)₄OCOCH=C(CH₃)₂

(T-27)

—NH—C₆H₄—OCO—C₆H₄—OCO—C₆H₄—O(CH₂)₄OCOCH=CH₂

(T-28)

—NH—C₆H₄—OCO—C₆H₃[O(CH₂)₄OCOCH=CH₂]—O(CH₂)₄OCOCH=CH₂

(T-29)

—NH—C₆H₄—O(CH₂)₅CH(—O—)CH₂ (epoxide)

(T-30)

—NH—C₆H₄—OCO—C₆H₄—O(CH₂)₄CH(—O—)CH₂

(T-31)

—NH—C₆H₄—OCO—C₆H₄—O(CH₂)₅CH(—O—)CH₂

(T-32)

—NH—C₆H₄—OCO—C₆H₃(CH₃)—O(CH₂)₄C(CH₃)(—O—)CH₂

(T-33)

—NH—C₆H₄—OCO—C₆H₃(CH₃)—O(CH₂)₃CH(—O—)CH₂

(T-34)

—NH—C₆H₄—OCO—C₆H₃(CH₃)—O(CH₂)₆CH(—O—)CH₂

(T-35)

TABLE 1-continued

| Exemplified compound | Ra | Rb | Rc |
|---|---|---|---|

(T-36) —NH—C6H4—OCO—C6H2(CH3)(CH3)—O(CH2)5CH(—O—)CH2

(T-37) —NH—C6H4—OCO—C6H4—O(CH2)5CH(—O—)CH2 (meta)

(T-38) —NH—C6H4—OCO—C6H4—COO(CH2)2CH(—O—)CH2 (meta)

(T-39) —NH—C6H4—OCO—C6H4—COO(CH2)3CH(—O—)CH2 (meta)

(T-40) —NH—C6H4—OCO—C6H2(Cl)(CH3)—O(CH2)2CH(—O—)CH2

(T-41) —NH—C6H4—OCO—C6H3(F)—O(CH2)3CH(—O—)CH2

(T-42) —NH—C6H4—OCO—C6H3(CN)—O(CH2)7CH(—O—)CH2

(T-43) —NH—C6H4—OCO—C6H4—OCO—C6H4—O(CH2)4CH(—O—)CH2

(T-44) —NH—C6H4—OCH3

(T-45) —Cl (T-46) —OH (T-47) —OCH3

(T-48) —O—CH2CH2CH(OCH3)CH3

(T-49) —S—C6H5

TABLE 1-continued

| Exemplified compound | Ra | Rb | Rc |
|---|---|---|---|

—O—⟨Ph⟩ (T-50)

—NH—⟨Ph⟩ (T-51)

—NH—⟨Ph⟩—OCO—⟨Ph⟩—OCOO(CH$_2$)$_4$OCOCH=CH$_2$ (T-52)

—NH—⟨Ph⟩—OCO—⟨Ph⟩—O(CH$_2$)$_4$OCH$_2$—[oxetane-CH$_3$] (T-53)

—NH—⟨Ph⟩—OCO—⟨Ph⟩—O(CH$_2$)$_5$OCH$_2$—[oxetane-C$_2$H$_5$] (T-54)

—NH—⟨Ph⟩—OCO—⟨Ph⟩—OCOO(CH$_2$)$_5$OCH$_2$—[oxetane-C$_2$H$_5$] (T-55)

—NH—⟨Ph⟩—COO—⟨Ph⟩—COO(CH$_2$)$_4$OCOCH=CH$_2$ (T-56)

—NH—⟨Ph⟩—COO—⟨Ph⟩—⟨Ph⟩—COO(CH$_2$)$_4$OCOCH=CH$_2$ (T-57)

—NH—⟨Ph⟩—OCO—⟨Ph⟩—O(CH$_2$)$_4$OCH=CH$_2$

The synthesis of the polymerizable compounds represented by formula (A), (I), (II), or (III) can be carried out with reference to known methods. Examples of the synthesis include, but are not limited to, the synthetic examples as shown below.

Another embodiment of the present invention is a composition containing at least one of the compounds represented by formula (A), (I), (II), or (III). Examples of substances to be contained in the composition together with the compound of the present invention include, but are not limited to, a polymerization initiator, a polymerizable or non-polymerizable liquid crystal compound, and a non-liquid crystal compound. The composition of the present invention preferably contains the compound(s) represented by formula (A), (I), (II), or (III) in an amount of 1 to 70% by mass.

Further, the compound or composition of the present invention can be easily polymerized, according to a usual manner.

For example, the compound or composition of the present invention can be favorably used for an optically anisotropic material, for example, for an optical compensation sheet and a polarizing plate. The optically anisotropic material can be produced in a usual manner, using the compound or composition of the present invention.

The refractive index anisotropy (birefringence difference, Δn) of the optically anisotropic material of the present invention is preferably 0.1 or more, more preferably from 0.1 to 0.3.

According to the present invention, a polymerizable compound having a large birefringence difference can be provided, a polymerizable liquid crystal composition composed of the compound can also be provided, and an optically anisotropic material composed of the compound or the composition can also be provided. The use of the compound, composition, or optically anisotropic material of the present invention can achieve reduction in thickness and weight, enhancement in brightness, and lowering of power consumption, with respect to image display devices such as liquid crystal display devices.

The present invention will be described in more detail based on the following examples, but the invention is not intended to be limited thereto. Further, in the case where the melting point (mp) of an exemplified compound is a high temperature, there is the possibility of occurrence of polymerization of the compound, which cannot be denied. Thus, in the case where a melting temperature is higher than 180° C., the mp is designated to as '>180° C.'.

EXAMPLES

Synthetic Example 1

Synthesis of Exemplified Compound (20)

The Exemplified compound (20) was synthesized, in accordance with the following scheme:

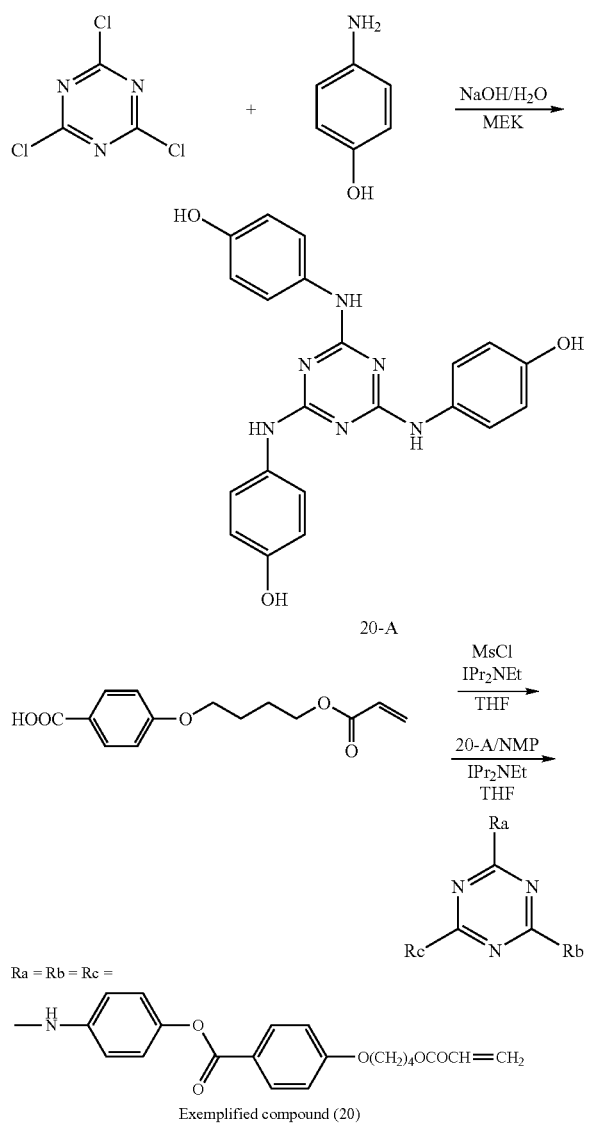

A 200-ml methyl ethyl ketone solution of 36.9 g (0.2 mol) of cyanuric chloride was cooled to 15° C. under a nitrogen atmosphere. Thereto, was added, in some portions, 76.4 g (0.7 mol) of p-hydroxyaniline, while the temperature was kept at 30° C. or less. After the completion of addition, 60 ml of an aqueous solution of 12 g (0.3 mol) sodium hydroxide was added dropwise thereto. The reaction system was stirred until its temperature reached room temperature, and then the temperature of the system was raised to 55° C., followed by stirring for further 2 hours. Thereafter, the temperature of the reaction system was raised to 70° C., followed by stirring for further 1 hour. The completion of the reaction was confirmed by TLC, and then methyl ethyl ketone was removed off by distillation under reduced pressure. To the residue, 500 ml of water was added, to prepare a dispersion. Three cycles of separation of the resultant solid by filtration, dispersion of the solid into water, and separation of the solid by filtration were performed, and then the resultant solid was dried, to give 72.4 g of (20-A) (yield 90%).

Under cooling on ice, 1.55 ml (20 mmol) of methanesulfonic chloride was added to 50 ml of a tetrahydrofuran solution of 4.8 g (18 mmol) of 4-(4-acryloyloxybutoxy)-benzoate, and 3.5 ml (20 mmol) of N,N-diisopropylethylamine was slowly added dropwise thereto. After stirring for 1 hour, 3.5 ml (20 mmol) of N,N-diisopropylethylamine was added thereto, and a solution of 2 g of (20-A) in 15 ml of N-methylpyrrolidone was added dropwise thereto. Thereafter, a 5-ml tetrahydrofuran (THF) solution of 0.02 g of N,N-dimethylaminopyridine was added dropwise thereto. The resultant mixture was stirred under ice-cooling for 1 hour, and then heated to room temperature, followed by stirring for 6 hours. The reaction liquid was added dropwise to 200 ml of methanol, and the resultant crystal was separated by filtration, and purified by silica gel column chromatography, to give 2.7 g of Exemplified compound (20) (yield 47%). The melting point of the thus-obtained Exemplified compound (20) was 162° C.

Synthetic Example 2

Synthesis of Exemplified Compounds (38), (40), (60), (61), and (63)

The Exemplified compounds (38), (40), (60), (61), and (63) were synthesized in the same manner as in the Synthetic example 1 of Exemplified compound (20), except for changing the 4-(4-acryloyloxybutoxy)-benzoic acid to an analogous benzoic acid compound in accordance with the target compound, respectively. The melting points of the thus-obtained exemplified compounds were as shown below:

mp of Exemplified compound (38): >180° C.,
mp of Exemplified compound (40): >180° C.,
mp of Exemplified compound (60): 157° C., and
mp of Exemplified compound (63): >180° C.

Example 1

Evaluation of Phase Transition Temperatures of Exemplified Compounds (15), (20), (38), (40), (60), (61), (63), (64), and (65) by Polarization Microscope Observation The phase transition temperatures of Exemplified compounds (15), (20), (38), (40), (60), (61), (63), (64), and (65) were measured by texture observation with a polarization microscope, and the results shown below were obtained. Here, since the measurement was made under heating, there was the possibility of initiation of polymerization of the compound in interest. Thus, in the case where a phase transition temperature was higher than 180° C., the phase transition temperature is designated to as '>180'.

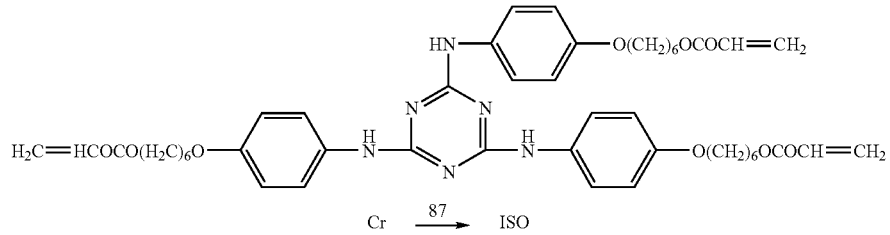
(15)
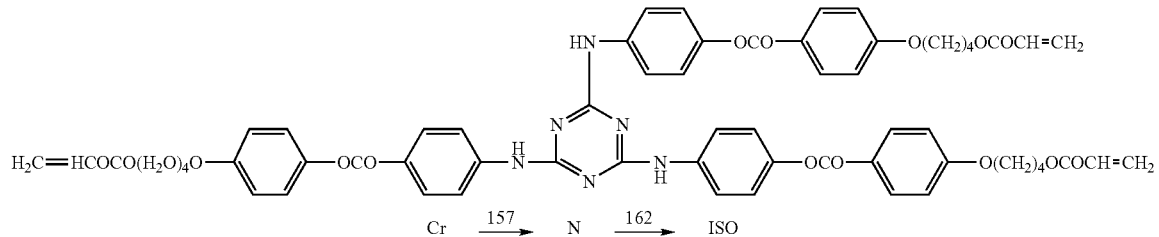
(20)
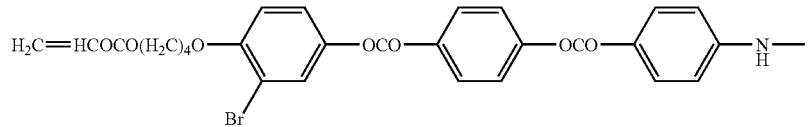
(38)
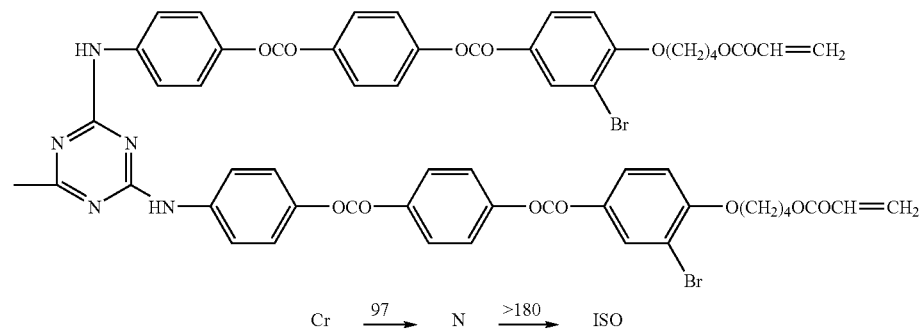
(40)
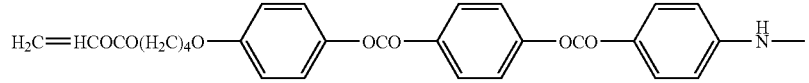
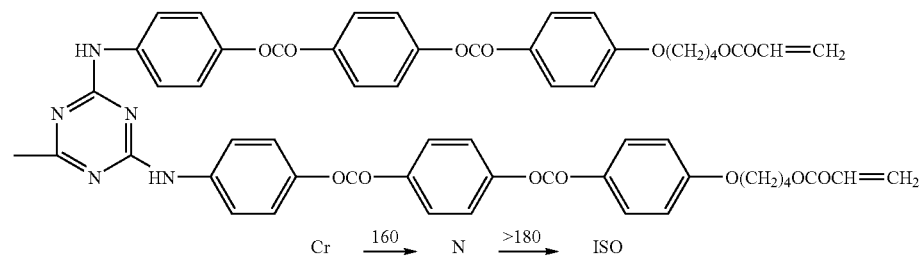

-continued (60)

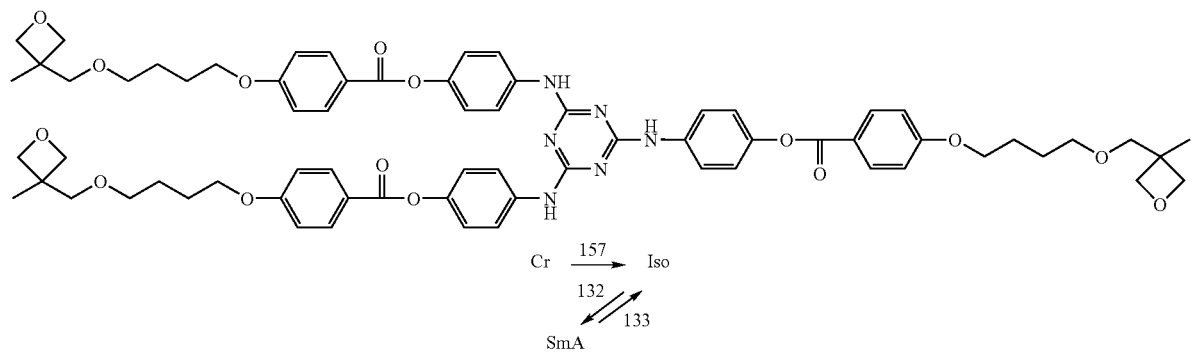

Cr $\xrightarrow{157}$ Iso $\xrightarrow{132}$ $\xleftarrow{133}$

SmA (63)

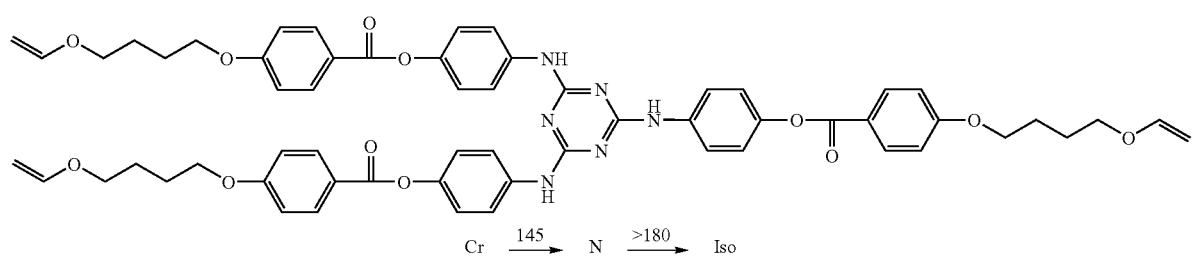

Cr $\xrightarrow{145}$ N $\xrightarrow{>180}$ Iso (64)

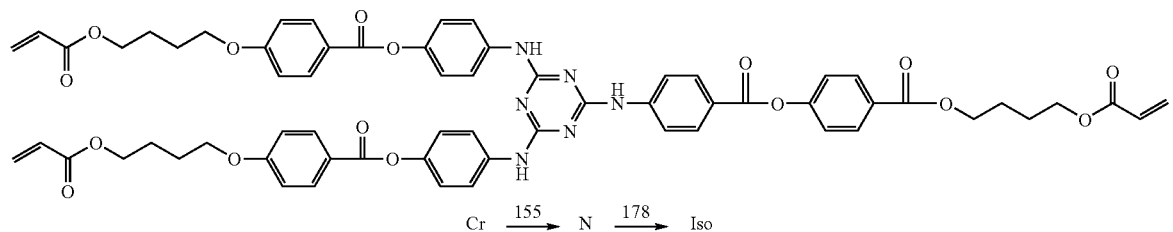

Cr $\xrightarrow{155}$ N $\xrightarrow{178}$ Iso (65)

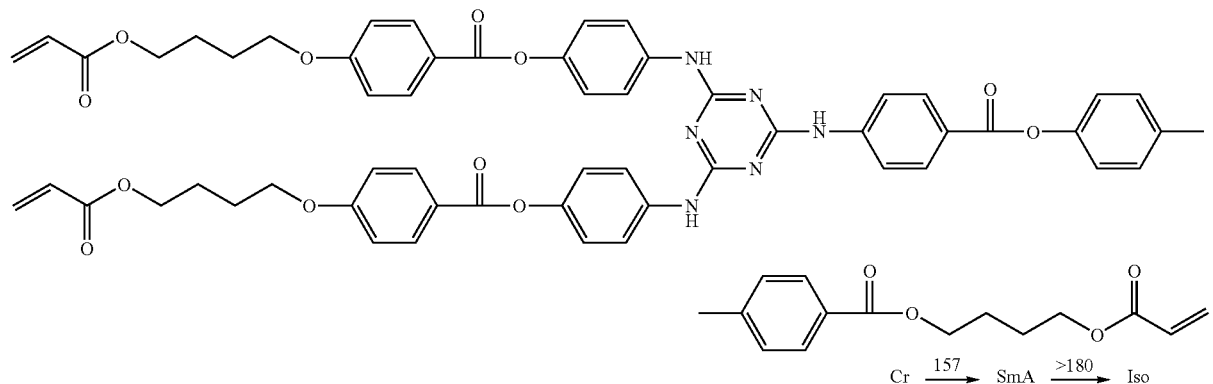

Cr $\xrightarrow{157}$ SmA $\xrightarrow{>180}$ Iso

As shown above, Exemplified compound (15) had a phase transition temperature of 87° C. from a crystal state (Cr) to an isotropic phase (ISO). Exemplified compound (20) had a phase transition temperature of 157° C. from a crystal state (Cr) to a nematic phase (N), and a transition temperature of 162° C. from the nematic phase (N) to an isotropic phase (ISO). Exemplified compound (38) had a phase transition temperature of 97° C. from a crystal state (Cr) to a nematic phase (N), and a transition temperature higher than 180° C. from the nematic phase (N) to an isotropic phase (ISO). Exemplified compound (40) had a phase transition tempera- ture of 160° C. from a crystal state (Cr) to a nematic phase (N), and a transition temperature higher than 180° C. from the nematic phase (N) to an isotropic phase (ISO). Exemplified compound (60) showed no liquid crystallinity upon raising of the temperature but the mp of 157° C., and had a phase transition temperature of 132° C. from an isotropic phase (ISO) to a smectic A phase (SmA) upon lowering the temperature and a phase transition temperature of 133° C. from the smectic A phase (SmA) to the isotropic phase (ISO). Exemplified compound (63) had a phase transition temperature of 145° C. from a crystal state (Cr) to a nematic phase (N), and a transition temperature higher than 180° C. from the nematic phase (N) to an isotropic phase (ISO). Exemplified compound (64) had a phase transition temperature of 155° C. from a crystal state (Cr) to a nematic phase (N), and a transition temperature of 178° C. from the nematic phase (N) to an isotropic phase (ISO). Exemplified compound (65) had a phase transition temperature of 157° C. from a crystal state (Cr) to a nematic phase (N), and a transition temperature higher than 180° C. from the nematic phase (N) to an isotropic phase (ISO).

Example 2

Preparation of Polymerizable Films of Exemplified Compounds (20), (38), (40), (60), (61), (63), (64), and (65), and Measurement of Δn Thereof A 25-% 1,1,2-trichloroethane solution of a mixture of 100 parts by mass of Exemplified 25 compound (20) and 4 parts by mass of Irgacure 819 (trade name, manufactured by Ciba Specialty Chemicals) as a polymerization initiator, was applied by spin coating, onto a glass plate on which a polyimide alignment film already subjected to homogeneous alignment process was formed, to form a thin film. The thin film was uniformly aligned upon alignment process at a substrate temperature of 132° C. The film was then irradiated with ultraviolet light at 200 mJ/cm$^2$, to form an optical compensation sheet A in which the alignment state of an optically anisotropic layer was fixed. The thus-formed optically anisotropic layer had a thickness of 0.9 μm.

In the similar manner as described above, optical compensation sheets B, C, D, E, F, and G were prepared using Exemplified compounds (38), (40), (60), (61), (63), and (64), respectively. The thickness of each of the resulting layers was set to be within a range from 0.9 μm to 1.0 μm.

With respect to the optical compensation sheets A, B, C, D, E, F, and G, birefringence difference (Δn) was determined using the film thickness and the retardation measured with KOBRA-WR (trade name, manufactured by Oji Scientific Instruments). The results were as follows: Δn=0.18 for the optical compensation sheet A, Δn=0.25 for the optical compensation sheet B, Δn=0.25 for the optical compensation sheet C, Δn=0.22 for the optical compensation sheet D, Δn=0.24 for the optical compensation sheet E, Δn=0.25 for the optical compensation sheet F, and Δn=0.23 for the optical compensation sheet G.

Comparative Example

Measurement of Δn of Exemplified Compound (A-1) in JP-A-2002-265475 and Exemplified Compound (A-1) in JP-A-2002-128742

With respect to Exemplified compound (A-1) as described in JP-A-2002-265475 and Exemplified compound (A-1) as described in JP-A-2002-128742, Δn of these compounds were determined, according to the methods as described in these publications. Exemplified compound (A-1) as described in JP-A-2002-265475 or Exemplified compound (A-1) as described in JP-A-2002-128742 was added in a small amount of 5% to 10%, based on the amount of a non-polymerizable liquid crystal compound RO-571 (trade name, manufactured by Dainippon Ink and Chemicals, Incorporated), and Δn of each of the above-mentioned exemplified compounds was extrapolated from the birefringence difference (Δn) of the thus-obtained mixed liquid crystal.

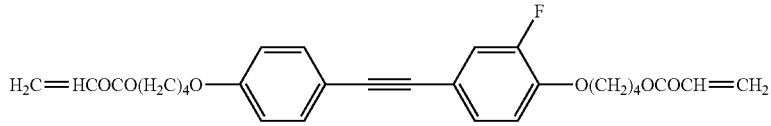

Exemplified compound (A-1) as described in JP-A-2002-128742 Extrapolated Δn was 0.23 upon the addition to the non-polymerizable liquid crystal compound 'RO-571', manufactured by Dainippon Ink and Chemicals, Incorporated

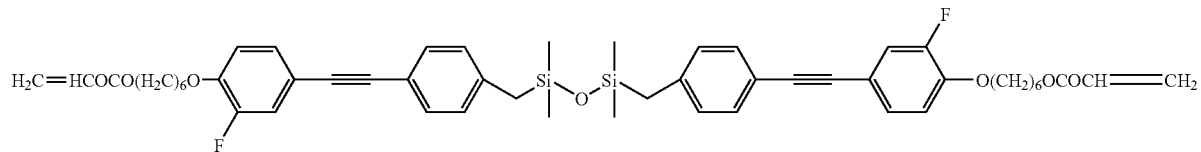

Exemplified compound (A-1) Disclosed in JP-A-2002-265475 Extrapolated Δn was 0.20 upon the addition from 5% and 10% to the non-polymerizable liquid crystal compound 'RO-571', manufactured by Dainippon Ink and Chemicals, Incorporated From the above results, it can be understood that while the Δn is 0.23 or less in the comparative examples, the Δn is from 0.18 to 0.25 in the examples using the exemplified compounds of the present invention, which is equivalent to or superior to those in the comparative examples.

Having described our invention as related to the present embodiments, it is our intention that the invention not be limited by any of the details of the description, unless otherwise specified, but rather be construed broadly within its spirit and scope as set out in the accompanying claims.

We claim:

1. A compound represented by formula (I):

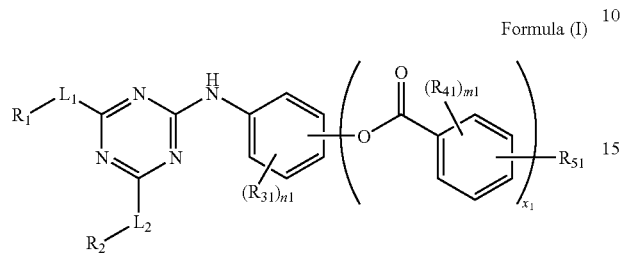

Formula (I)

wherein $L_1$ and $L_2$ each represent a single bond or a divalent linking group, which may be the same or different from each other; $R_1$ and $R_2$ each independently represent a hydrogen atom or a substituent; $R_{31}$ and $R_{41}$ each represent a substituent, which may be the same or different from each other; n1 represents an integer of 0 to 4; when n1 is 2 or more, $R_{31}$'s may be the same or different from each other, or $R_{31}$'s may form a ring, if possible; m1 represents an integer of 0 to 4; when m1 is 2 or more, $R_{41}$'s may be the same or different from each other, or $R_{41}$'s may form a ring, if possible; $X_1$ represents an integer of 1 to 5; when $X_1$ is 2 or more, $(R_{41})_{m1}$'s may be the same or different from each other; and $R_{51}$ represents an alkoxy group, an alkoxycarbonyl group, or an alkoxycarbonyloxy group, each of which has a group represented by P1, P2, P3, or P4, in which an alkoxy moiety of the group represented by $R_{51}$ may have an ether bond therein:

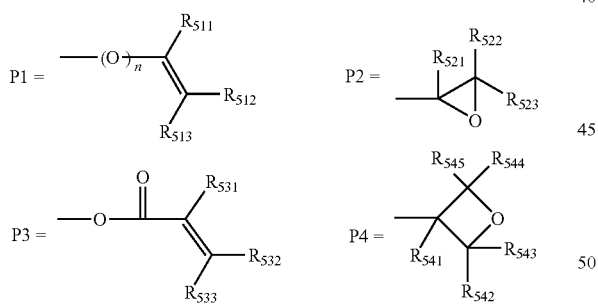

wherein $R_{511}$, $R_{512}$, $R_{513}$, $R_{521}$, $R_{522}$, $R_{523}$, $R_{531}$, $R_{532}$, $R_{533}$, $R_{541}$, $R_{542}$, $R_{543}$, $R_{544}$, and $R_{545}$ each independently represent a hydrogen atom or an alkyl group; and n represents 0 or 1.

2. The compound according to claim 1, which is a compound having liquid crystallinity.

3. A composition, comprising at least one compound according to claim 1.

4. An optically anisotropic material, comprising the compound according to claim 1.

5. The optically anisotropic material according to claim 4, which has a refractive index difference ($\Delta n$) of 0.1 to 0.3.

6. A liquid crystal display device, comprising the optically anisotropic material according to claim 4.

7. An optically anisotropic material, comprising the composition according to claim 3.

8. The optically anisotropic material according to claim 7, which has a refractive index difference ($\Delta n$) of 0.1 to 0.3.

9. A liquid crystal display device, comprising the optically anisotropic material according to claim 7.

10. A compound represented by formula (II):

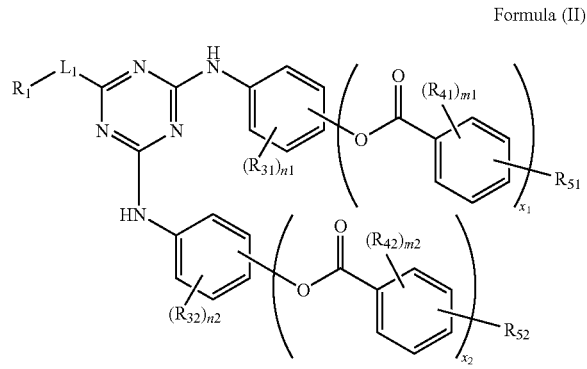

Formula (II)

wherein $L_1$ represents a single bond or a divalent linking group; $R_1$ represents a hydrogen atom or a substituent; $R_{31}$, $R_{32}$, $R_{41}$, and $R_{42}$ each represent a substituent, which may be the same or different from each other; n1 and n2 each independently represent an integer of 0 to 4; when n1 is 2 or more, $R_{31}$'s may be the same or different from each other, or $R_{31}$'s may form a ring, if possible; when n2 is 2 or more, $R_{32}$'s may be the same or different from each other, or $R_{32}$'s may form a ring, if possible; m1 and m2 each independently represent an integer of 0 to 4; when m1 is 2 or more, $R_{41}$'s may be the same or different from each other, or $R_{41}$'s may form a ring, if possible; when m2 is 2 or more, $R_{42}$'s may be the same or different from each other, or $R_{42}$'s may form a ring, if possible; $X_1$ and $X_2$ each independently represent an integer of 1 to 5; when $X_1$ is 2 or more, $(R_{41})_{m1}$'s may be the same or different from each other; when $X_2$ is 2 or more, $(R_{42})_{m2}$'s may be the same or different from each other; and $R_{51}$ and $R_{52}$ each independently represent an alkoxy group, an alkoxycarbonyl group, or an alkoxycarbonyloxy group, each of which has a group represented by P1, P2, P3, or P4, in which an alkoxy moiety of the group represented by $R_{51}$ or $R_{52}$ may have an ether bond therein:

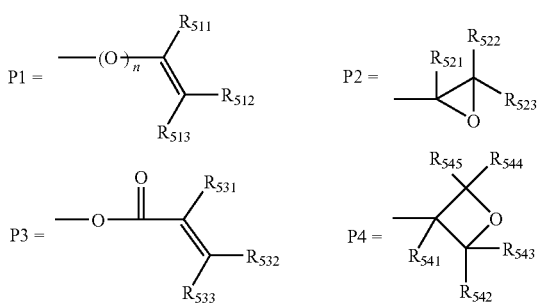

wherein $R_{511}$, $R_{512}$, $R_{513}$, $R_{521}$, $R_{522}$, $R_{523}$, $R_{531}$, $R_{532}$, $R_{533}$, $R_{541}$, $R_{542}$, $R_{543}$, $R_{544}$, and $R_{545}$ each independently represent a hydrogen atom or an alkyl group; and n represents 0 or 1.

11. The compound according to claim 10, which is a compound having liquid crystallinity.

12. A composition, comprising at least one compound according to claim 10.

13. An optically anisotropic material, comprising the compound according to claim 10.

14. The optically anisotropic material according to claim 13, which has a refractive index difference (Δn) of 0.1 to 0.3.

15. A liquid crystal display device, comprising the optically anisotropic material according to claim 13.

16. An optically anisotropic material, comprising the composition according to claim 12.

17. The optically anisotropic material according to claim 16, which has a refractive index difference (Δn) of 0.1 to 0.3.

18. A liquid crystal display device, comprising the optically anisotropic material according to claim 16.

19. A compound represented by formula (III):

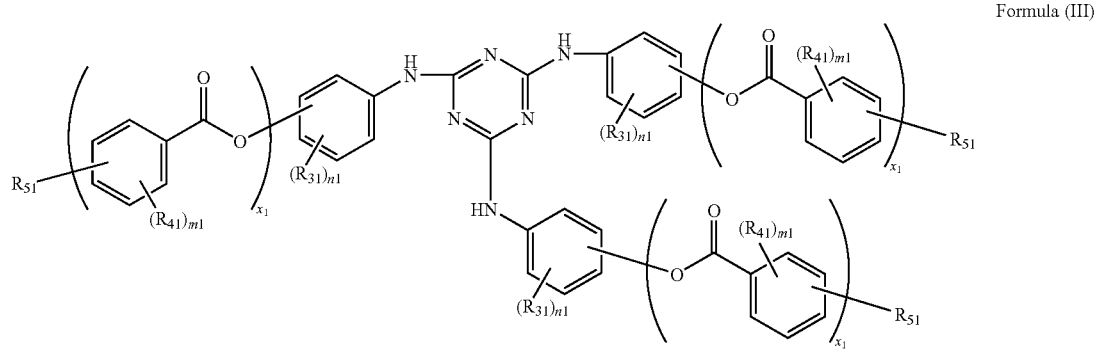

Formula (III)

wherein $R_{31}$ and $R_{41}$ each represent a substituent, which may be the same or different from each other; n1 represents an integer of 0 to 4; when n1 is 2 or more, $R_{31}$'s on a single benzene ring may be the same or different from each other, or may form a ring, if possible; m1 represents an integer of 0 to 4; when m1 is 2 or more, $R_{41}$'s on a single benzene ring may be the same or different from each other, or may form a ring, if possible; $X_1$ represents an integer of 1 to 5; when $X_1$ is 2 or more, a series of $(R_{41})_{m1}$'s may be the same or different from each other; and $R_{51}$ represents an alkoxy group, an alkoxycarbonyl group, or an alkoxycarbonyloxy group, each of which has a group represented by P1, P2, P3, or P4, in which an alkoxy moiety of the group represented by $R_{51}$ may have an ether bond therein:

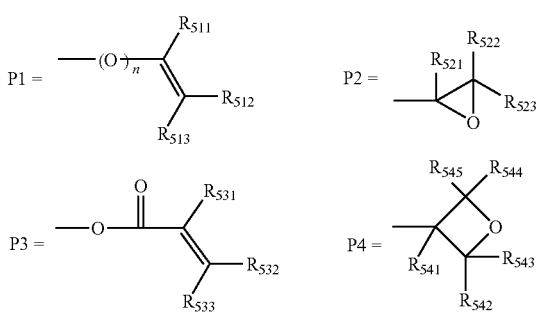

wherein $R_{511}$, $R_{512}$, $R_{513}$, $R_{521}$, $R_{522}$, $R_{523}$, $R_{531}$, $R_{532}$, $R_{533}$, $R_{541}$, $R_{542}$, $R_{543}$, $R_{544}$, and $R_{545}$ each independently represent a hydrogen atom or an alkyl group; and n represents 0 or 1.

20. The compound according to claim 19, which is a compound having liquid crystallinity.

21. A composition, comprising at least one compound according to claim 19.

22. An optically anisotropic material, comprising the compound according to claim 19.

23. The optically anisotropic material according to claim 22, which has a refractive index difference (Δn) of 0.1 to 0.3.

24. A liquid crystal display device, comprising the optically anisotropic material according to claim 22.

25. An optically anisotropic material, comprising the composition according to claim 21.

26. The optically anisotropic material according to claim 25, which has a refractive index difference (Δn) of 0.1 to 0.3.

27. A liquid crystal display device, comprising the optically anisotropic material according to claim 25.

28. The compound according to claim 1, wherein $R_{31}$ is a halogen atom, an alkyl group, a cyano group, a hydroxyl group, an alkoxy group, an aryloxy group, an acyloxy group, an alkoxycarbonyloxy group, an amino group, or an acylamino group.

29. The compound according to claim 1, wherein $R_{41}$ is a halogen atom, an alkyl group, an alkenyl group, an alkynyl group, a cyano group, a hydroxyl group, a nitro group, a carboxyl group, an alkoxy group, an aryloxy group, an acyloxy group, a carbamoyloxy, an alkoxycarbonyloxy group, an aryloxycarbonyloxy group, an amino group, an acylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, or a sulfamoyl group.

30. The compound according to claim 1, wherein the substitution position of the substituted benzoyloxy group that is a group on the aminophenyl group is in the para-position relative to the amino group.

31. The compound according to claim 10, wherein $R_{31}$ is a halogen atom, an alkyl group, a cyano group, a hydroxyl group, an alkoxy group, an aryloxy group, an acyloxy group, an alkoxycarbonyloxy group, an amino group, or an acylamino group.

32. The compound according to claim 10, wherein $R_{41}$ is a halogen atom, an alkyl group, an alkenyl group, an alkynyl group, a cyano group, a hydroxyl group, a nitro group, a carboxyl group, an alkoxy group, an aryloxy group, an acyloxy group, a carbamoyloxy, an alkoxycarbonyloxy group, an aryloxycarbonyloxy group, an amino group, an acylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, or a sulfamoyl group.

33. The compound according to claim 10, wherein $R_{32}$ is a halogen atom, an alkyl group, a cyano group, a hydroxyl group, an alkoxy group, an aryloxy group, an acyloxy group, an alkoxycarbonyloxy group, an amino group, or an acylamino group.

34. The compound according to claim 10, wherein $R_{42}$ is a halogen atom, an alkyl group, an alkenyl group, an alkynyl group, a cyano group, a hydroxyl group, a nitro group, a carboxyl group, an alkoxy group, an aryloxy group, an acyloxy group, a carbamoyloxy, an alkoxycarbonyloxy group, an aryloxycarbonyloxy group, an amino group, an acylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, or a sulfamoyl group.

35. The compound according to claim 10, wherein the substitution position of the substituted benzoyloxy group that is a group on the aminophenyl group is in the para-position relative to the amino group.

36. The compound according to claim 19, wherein $R_{31}$ is a halogen atom, an alkyl group, a cyano group, a hydroxyl group, an alkoxy group, an aryloxy group, an acyloxy group, an alkoxycarbonyloxy group, an amino group, or an acylamino group.

37. The compound according to claim 19, wherein $R_{41}$ is a halogen atom, an alkyl group, an alkenyl group, an alkynyl group, a cyano group, a hydroxyl group, a nitro group, a carboxyl group, an alkoxy group, an aryloxy group, an acyloxy group, a carbamoyloxy, an alkoxycarbonyloxy group, an aryloxycarbonyloxy group, an amino group, an acylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, or a sulfamoyl group.

38. The compound according to claim 19, wherein the substitution position of the substituted benzoyloxy group that is a group on the aminophenyl group is in the para-position relative to the amino group.

* * * * *